Patented May 24, 1932

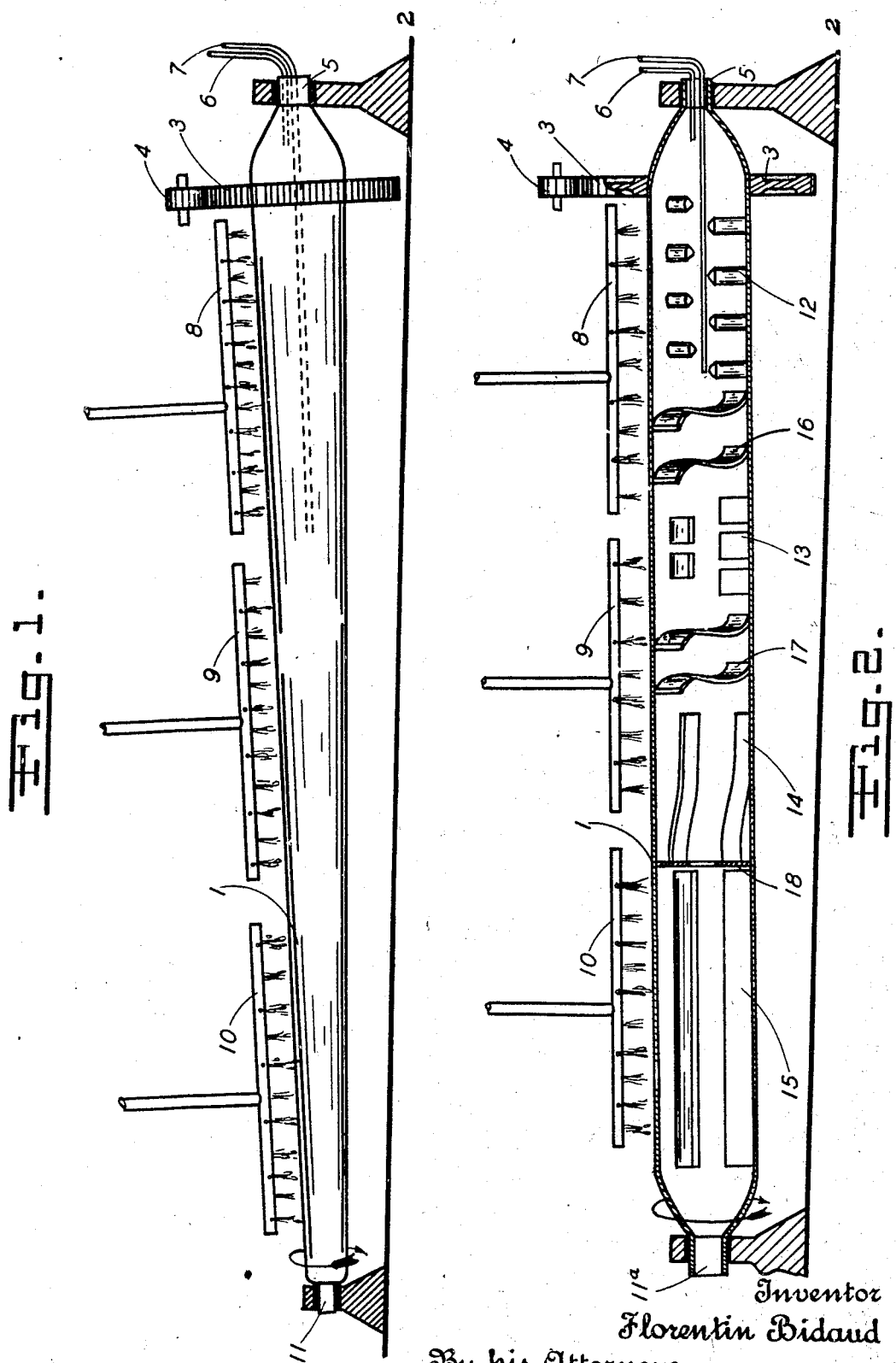

1,859,579

UNITED STATES PATENT OFFICE

FLORENTIN BIDAUD, OF ROUSSILLON, FRANCE, ASSIGNOR, BY MESNE ASSIGNMENTS, TO E. I. DU PONT DE NEMOURS AND COMPANY, OF WILMINGTON, DELAWARE, A CORPORATION OF DELAWARE

PROCESS FOR MAKING CELLULOSE ACETATE

Application filed May 27, 1927, Serial No. 194,714, and in France July 26, 1926.

This invention relates to a method of making cellulose acetate.

The manufacture of cellulose acetate takes place usually in the presence of a liquid, generally acetic acid, which is a solvent of the product sought. In this manufacture, the acetylating reaction passes through well-defined phases, which require a strict control of the temperature and which correspond to variable physical states of the reacting mass. At the beginning of the operation, the cellulose fibre (cotton or wood fibre, which may have been subjected to alkaline purifying or bleaching treatments or, if desired, to a preliminary treatment intended to facilitate its acetylation) is merely wetted by the reagent and later on it swells, forming a sticky mass; gradually, this mass undergoes transformation in a mass more flowing, to take finally the appearance of a more or less viscous gum.

Owing to the existence of these variable physical states of the reacting mass and the thermal phenomena which take place during the process, the technical manufacture of cellulose acetate is a very delicate operation, it being considerably effected by a change in the type or in the scale of the apparatus employed.

Powerful mixing machines, similar to the kneading troughs used in celluloid manufacture have been used. Such apparatus are limited in capacity, and their agitation requires much power. In U. S. Patent No. 1,566,398, a process is described by means of which, in a single operation, considerable quantities of cellulose acetate are obtained, the process being characterized by the use of rotating apparatus of large capacity. Apparatus has also been devised permitting a rational mixing of the reacting masses, during each phase of the manufacture, and adapted for continuous manufacture.

According to the present invention, cellulose acetate of great technical value is manufactured in apparatus of small diameter in proportion to its length, revolving about its axis, which is inclined to the horizontal, in which apparatus the reacting mass circulates in a continual manner while the process is being carried out.

In carrying out the present invention, the circulation of the material and its agitation are produced by the rotation of the apparatus about its inclined axis. As the reaction takes place progressively, fixed zones of reaction are established in the apparatus, each zone corresponding to a definite phase of the operation. The temperature of these zones is easily regulated by heating or cooling the corresponding portion of the apparatus, for example, by sprinkling with hot or cold water.

The introduction of the reagents may take place at one end of the apparatus. They can also be introduced at any desired place along the path followed by the reacting mass by means of a suitable device, for example, a tube placed at the axis of rotation. The apparatus is, in this manner, used for performing all the successive phases of the manufacture, preliminary treatment, acetylation properly so called, and treatment of the primary product of the acetylation with a view to modifying its properties, and particularly its solubility.

These apparatus may moreover be provided with internal members secured to the walls, adapted for any special purposes, such as, for instance, to effect the circulation of the material and its agitation.

Walls for the purpose of slowing down the circulation of the reacting mass will cause an accumulation of material in certain zones, thereby utilizing more fully the capacity of the apparatus and making possible the use of a shorter apparatus. Suitable devices may also be useful in certain places to insure the regular advance of the mass. It has been found that members in the form of perforated discs, continuous or discontinuous helicoidal partitions, suitably disposed, are particularly advantageous. By means of these devices, any suitable amount of the product may be accumulated in any region, while insuring and regulating its advance. A decrease or an increase of the internal diameter also produces a modification of the circulation of the material. This change in the diameter may be gradual, for the purpose of avoiding corners where the product could lodge without circulating.

In certain portions of the apparatus, more especially where an accumulation of the product is produced, it may be useful to produce a more energetic mixing. For this purpose, devices adapted to the state of the reacting mass are used. Experience shows that straight or bent rods, secured either radially or at some distance from the walls, are particularly effective in the zone of the apparatus in which the beginning of the operation takes place. In the second portion of the apparatus, where the mass has a pasty or liquid consistency, paddles give a good result.

These agitating members, secured to the wall, can be, in certain zones, usefully combined with baffles independent of the walls, secured for instance, to a shaft placed at the axis of the apparatus.

All these devices for internal stirring affect the manner in which the reacting mass circulates. In giving them a suitable form, they may be made to co-operate effectively in the regulation of this circulation, for instance, stirring paddles inclined to the axis of the apparatus have an action similar to that of helicoidal partitions.

Particular conditions in the reaction may also be obtained, according to this invention, by substituting, partially or totally, for the internal devices secured to the walls, similar devices, fixed or movable, independent of the walls, secured, for instance, to a shaft placed at the axis of the apparatus.

It has been ascertained that these various devices disposed inside the apparatus effect, by their thermal conductivity, the maintenance of the reaction temperature at the required degree. Besides, a heating or cooling fluid may be caused to circulate inside these devices by means of a suitable arrangement.

In carrying out the present invention, as the material circulates in a continuous manner in the apparatus, the reaction zones contain a relatively small quantity of product; consequently, heating and cooling surfaces are available which permit considerable thermal variations to be obtained rapidly. It is possible in this way to effect certain phases of the operation at a relatively high temperature during a relatively short time, this being particularly useful in the manufacture of cellulose acetate, owing to the great sensitiveness of the reacting masses to the action of heat. In this way, processes of acetylation may be carried out which it is impossible to perform in apparatus of the same daily output working discontinuously. This facility of regulation of the temperature permits the operation to be conducted under the most desirable conditions and products of superior quality to be obtained.

A further advantage resulting from carrying out the invention is the fact that a large daily production is obtained with apparatus occupying a small space and remarkably easy to manipulate.

From a purely mechanical point of view, the apparatus described above requires, for the mixing, a mechanical power which is uniform, owing to the fact that all the phases of the reaction are always present simultaneously.

It will be understood that, according to the present invention, the manufacture of cellulose acetate can be performed in several rotating apparatus placed successively; the material, having been subjected in one of them to some of the manufacturing operations, arrives continuously in the next, new reagents being added if necessary, in order to undergo the following operations. These apparatus may be of different inclination and rotating with different speeds, and their capacity may be utilized to a lesser or greater extent.

Referring to the drawings filed herewith, which illustrate, purely as examples, which are not limitative, apparatus according to the invention:

Fig. 1 represents diagrammatically in section an apparatus according to the invention;

Fig. 2 represents diagrammatically in section an alternative construction.

Both apparatus consist of a shell, in the shape of a tapering cone 1 (Fig. 1) or of a cylinder 1ª (Fig. 2), adapted to rotate about an axis slightly inclined to the horizontal (which latter is indicated by the line 2). The shell is provided with a toothed crown 3, gearing with a pinion 4 which allows a rotating motion to be imparted to the apparatus. The cellulose material is introduced at the end 5 and the reagents are added by the tube 6. The tube 7 permits the introduction, if desired, of other reagents in the apparatus, in the path of the reacting mass. Hot or cold water is caused to flow on the outer surface of the cone by sprinklers such as 8, 9, and 10. In the apparatus shown in Fig. 1, there are no stirring devices and the reacting mass progresses along the apparatus under the influence of the rotation imparted to the shell and the gum resulting from the process flows continuously by the discharge spout 11.

The apparatus shown in Fig. 2 further comprises internal stirring members adapted to cause intensive mixing. The reacting mass, in its progress along the apparatus, is stirred successively by straight pointed rods 12, by small paddles 13, then by paddles 14 and 15 of different shape, the paddles 14 being slightly inclined, helicoidal fashion, for the purpose of co-operating in the regular advance of the mass. Inside the shell shown in Fig. 2 are also disposed helicoidal baffles 16 and 17 intended to insure a regular and continuous advance of the reacting mass.

A disc 18, provided with a central opening, causes an accumulation of matter at that point.

Having thus described my invention, what I claim is:

1. The process of continuous manufacture of cellulose acetate, which comprises imparting to the materials to be treated a continuous rotary motion about an axis inclined to the horizontal thereby to cause continuous forward movement of the reacting mass during the entire reaction process and checking the speed of the mass at different points.

2. The process of continuous manufacture of cellulose acetate, which comprises imparting to the materials to be treated a continuous rotary motion about an axis inclined to the horizontal thereby to cause continuous forward movement of the reacting mass during the entire reaction process, stirring the mass during such rotary and forward movements, and checking the speed of movement of the mass at different points.

3. The process of continuous manufacture of cellulose acetate, which comprises imparting to the materials to be treated a continuous rotary motion about an axis inclined to the horizontal thereby to cause continuous forward movement of the mass during the entire reacting process, and stirring the reacting mass with different degrees of intensity corresponding with the physical characteristics of the mass in different zones during its forward movement.

4. The process of continuous manufacture of cellulose acetate which comprises imparting to the materials to be treated a continuous rotary motion about the axis inclined to the horizontal thereby to cause continuous forward movement of the reacting mass during the entire reaction process and introducing reagents in the path of the reacting mass.

5. The process of continuous manufacture of cellulose acetate which comprises imparting to the materials to be treated a continuous motion about an axis inclined to the horizontal thereby to cause forward movement of the reacting mass during the entire reaction process, checking the speed of the mass at different points and introducing reagents in the path of the reacting mass.

6. The process of continuous manufacture of cellulose acetate which comprises imparting to the materials to be treated a continuous rotary motion about an axis inclined to the horizontal thereby to cause continuous forward movement of the reacting mass during the entire reaction process, stirring the mass during such rotary and forward movements, checking the speed of movement of the mass at different points and introducing reagents in the path of the reacting mass.

7. The process of continuous manufacture of cellulose acetate which comprises imparting to the materials to be treated a continuous rotary motion about an axis inclined to the horizontal thereby to cause continuous forward movement of the mass during the entire reacting process, stirring the reacting mass with different degrees of intensity corresponding with the physical characteristics of the mass in different zones during its forward movement and introducing reagents in the path of the reacting mass.

8. The process of continuous manufacture of cellulose acetate which comprises imparting to the materials to be treated a continuous rotary motion about an axis inclined to the horizontal thereby to cause continuous forward movement of the reacting mass during the entire reaction process and controlling the temperature of the mass in different zones during its forward movement.

9. The process of continuous manufacture of cellulose acetate which comprises imparting to the materials to be treated a continuous rotary motion about an axis inclined to the horizontal thereby to cause continuous forward movement of the mass during the entire reacting process, stirring the reacting mass with different degrees of intensity corresponding with the physical characteristics of the mass at different zones during its forward movement and controlling the temperature of said mass in different zones during its forward movement.

10. The process of continuous manufacture of cellulose acetate which comprises imparting to the materials to be treated a continuous rotary motion about an axis inclined to the horizontal thereby to cause continuous forward movement of the mass during the entire reacting process, stirring the reacting mass with different degrees of intensity corresponding with the physical characteristics of the mass at different zones during its forward movement, introducing reagents in the path of the reacting mass and controlling the temperature of said mass in different zones during its forward movement.

In testimony whereof I have signed my name to this specification.

FLORENTIN BIDAUD.